Jan. 22, 1957  L. T. COOKSON  2,778,464

INTERMITTENT DRIVE FOR A COUNTING DEVICE

Filed March 13, 1952

INVENTOR.
LEONARD T. COOKSON
BY
ATTORNEY

United States Patent Office 2,778,464
Patented Jan. 22, 1957

---

2,778,464

INTERMITTENT DRIVE FOR A COUNTING DEVICE

Leonard T. Cookson, Kalamazoo, Mich., assignor to The Upjohn Company, Kalamazoo, Mich., a corporation of Michigan Application March 13, 1952, Serial No. 276,337

7 Claims. (Cl. 192—12)

This invention relates to a device for converting that portion of reciprocating or oscillating motion which is in a selected direction into intermittent, uni-directional rotary motion whereby a counter having a rotatable shaft may be actuated for recording the lineal total of said motion in a selected direction.

In presently known counting mechanisms for counting the lineal total of motion in a selected direction of reciprocating or oscillating actuating mechanism, there is normally provided a mechanism for converting the strokes thereof in said selected direction into rotary motion and for doing so in such a manner that the length of said strokes, whether or not they are of unequal length, are automatically accumulated. Thus, a counting device of conventional type driven by a rotatable shaft may be actuated and the total straight line movement in said selected direction of a reciprocating member may be recorded in terms of rotations of the rotatable driving shaft for the counter. However, in presently known devices for effecting such translation, wherein a pair of one-way clutch mechanisms are employed, the clutch mechanisms are not readily exposable for adjustment and repair so that when repair or adjustment is needed there is normally required a major task of substantially dissembling the mechanism in order to get at the clutch portions thereof.

In the particular type of such translating mechanisms used in laboratory work where the energy output of test animals, such as rats, is measured by the number of times the test animal is able to raise a predetermined weight by movement of its leg, it is necessary to have mechanism which is extremely accurate and delicate and mechanism wherein a minimum of the rat's energy will be absorbed in overcoming inertia within the mechanical measuring apparatus. Therefore, it is necessary to have translating mechanism which is sufficiently accurate that the minimum of motion will be lost in taking up slack in the mechanism and of sufficient lightness in its parts that a minimum of the rat's energy will be expended in overcoming inertia. These conditions require that the parts be as small as possible. With parts being very small, and yet operating as precision equipment, the problem of maintaining the parts in proper operational relationship to each other may become a delicate task. Accordingly, it is desirable that a translating device be provided having a high degree of accuracy and which will require a minimum of disturbance of the parts when oiling, cleaning, adjustment or other maintenance work is done upon them.

Accordingly, a principal object of the invention is to provide a device for translating that part of reciprocating or oscillating motion which is in a selected direction to rotary, uni-directional motion, which device will be accurate in operation and yet which will be comprised of parts having minimum mass.

A further object of the invention is to provide a device, as aforesaid, in which the parts requiring adjustment and maintenance from time to time will be readily accessible without requiring dissembly thereof with respect to the structure upon which they are mounted.

A further object of the invention is to provide a device, as aforesaid, in which the parts are sufficiently simple as to be of minimum cost and to require minimum maintenance.

A further object of the invention is to provide a device, as aforesaid, which will be accurate in its ability to convert reciprocating motion in a selected direction into uni-directional rotary motion.

A further object of the invention is to provide a device, as aforesaid, which will have relatively little lost motion at the beginning of any given period of operation.

Other objects and purposes of the invention will be apparent to persons acquainted with apparatus of this general type upon a reading of the following description and inspection of the accompanying drawing.

In the drawing:

Figure 1 indicates a central sectional view of my improved translating device and shown assembled in operational relationship with the rotatable shaft of the counter.

General description

Figure 1:
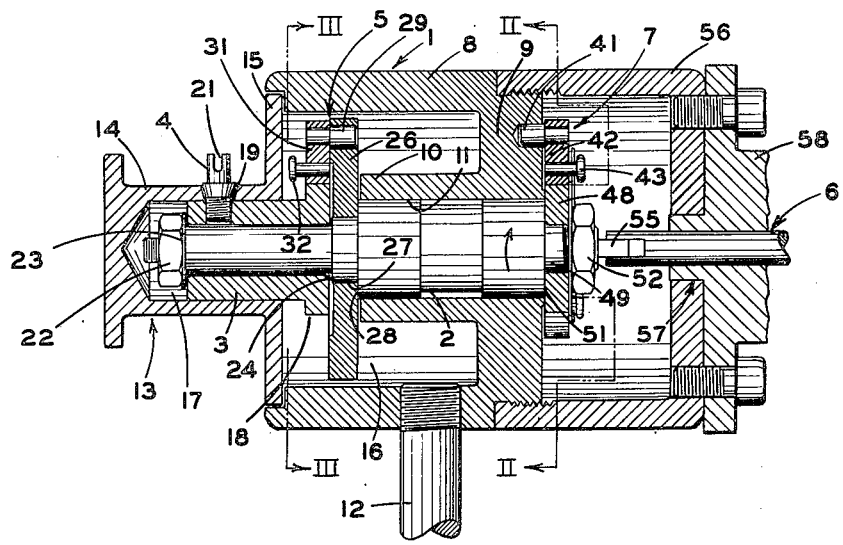

In general my device contemplates a base member 1 within which is supported a shaft 2. On said shaft is supported a sleeve 3 which is connected with a pin 4. The reciprocating member as a cord tied to the leg of the test animal, is affixed to this pin and this constitutes the point of application of the reciprocating motion of which the motion in one direction is to be separated and converted to uni-directional rotary motion. The pin 4 responds to the reciprocating motion by causing an oscillating motion of the sleeve 3 and this acts through the uni-directional clutch 5 to cause intermittent uni-directional rotary motion of the shaft 2. The shaft 2 is connected to the shaft 6 through any conventional coupling means and the shaft 6 drives a conventional counter. A uni-directional brake 7 is provided to prevent rotation of the shaft 2 in a reverse direction during reverse movement of the pin 4.

Detailed description

For convenience of reference, and not as limiting, the following terminology will be utilized in this description. The words "inward" and "outward", and derivatives thereof, will refer to directions toward and away from the geometric center of the device and the terms "rightward" and "leftward" and derivatives thereof will refer to directions as appearing in Figure 1 of the drawing.

Considering now the apparatus in more detail, the base 1 is of generally cup-like shape having an annular portion 8, a radially arranged web portion 9 and a central boss 10 provided with an internal opening 11 arranged co-axially with the annular portion 8. A threaded rod or tube 12 may engage a selected part of the annular portion 8 for support of the apparatus upon any suitable means.

The shaft 2 is rotatably supported within the internal opening 11 and it, in turn, supports a sleeve 3 at its leftward end. A nut 22 holds a washer 23 tightly against a suitable shoulder near the leftward end of said shaft to hold the sleeve 3 on the shaft, but the distance from the inner surface of said washer 23 and the outer surface of the shaft shoulder 24 is sufficiently greater than the axial length of said sleeve 3 that the free rotation of said sleeve on said shaft is not impaired.

A cap 13 is supported on the sleeve 3. It comprises a hollow thimble portion 14 and a flange 15, which latter is arranged with respect to the base 1 so that said thimble portion is co-axial with the annular portion 8 and the flange 15 cooperates with the free edge of the annular portion 8 to define the chamber 16 therein. Said sleeve extends inwardly of the flange 15 and has a radially extending flange 18 at its inner end. The pin 4 extends through the opening 19 in the thimble portion 14 and is threadedly received into the sleeve 3 for holding said cap 13 for rotation with said sleeve. If desired, a slot 21 may be provided in the end of said pin to assist in turning same into and out of threaded engagement with the sleeve 3. The reciprocable member whose motion in one direction is to be measured, as a cord attached to a test rat's leg, is affixed to the outer end of the pin 4.

A driving disk 26 is supported on the step 27 of said shaft 2 and against the shoulder 28 and is affixed to said shaft in any convenient manner for rotation therewith. A pin 29 is fastened in any convenient manner, as by press fitting, to the driving disk 26 near the periphery thereof and pivotally supports the pawl or clutch disk 31. Said pawl disk has a pin 32 extending therefrom in a direction parallel to the axis of said pawl disk and from a point thereon preferably on the same diameter as that occupied by said pin 29 but near the opposite end of said diameter.

A spring supporting pin 33 is affixed in any convenient manner to the driving disk 26 at a point near the periphery thereof and circumferentially spaced from the pin 29 and a light wire spring is affixed thereto. A spring guide pin 36 (Figure 3) is affixed to the driving disk 26 between the pin 33 and the pin 29 at such a point that the wire spring 34 will be held by pin 36 against the pin 32 with sufficient force that it will urge said pawl disk 31 with a definite, but light, force against the flange 18 of the sleeve 3. Similar pawl disks 37 and 38 are mounted on the driving disk 26 and are similarly held by wire springs against the peripheral edge of the flange 18.

It will be apparent that any convenient number of such pawl disks and spring assemblies may be utilized and that the employment of three thereof in this specific embodiment is for illustrative purposes only.

Figure 3:
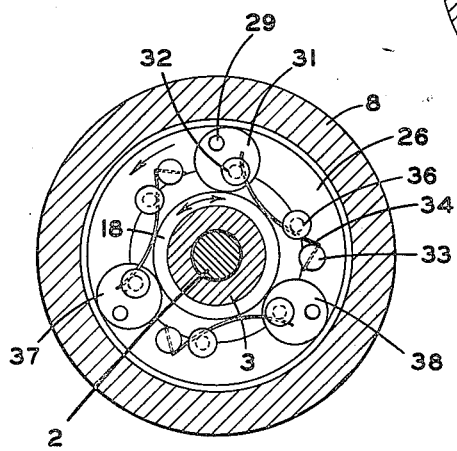
Figure 3 is a sectional view taken on the line III—III of Figure 1.

It will be apparent from an inspection of Figure 3 that oscillatory motion of the sleeve 3, as indicated by the double headed arrow in Figure 3, will be converted into intermittent uni-directional rotary motion of the driving disk 26 in the direction indicated by the single headed arrow in Figure 3.

Figure 2:
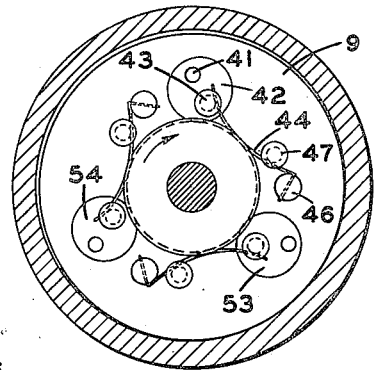
Figure 2 is a sectional view taken on the line II—II of Figure 1.

Turning now to the uni-directional brake 7 shown in Figures 1 and 2, it will be apparent that the pawl construction is preferably identical with the pawl construction utilized with the driving disk 26 and shown in Figure 3. A pin 41 is fixed, as by press fitting, into the web portion 9 of the base 1 and it pivotally supports a pawl disk 42 which pawl disk has a spring engaging pin 43 thereon extending therefrom. A wire spring 44 is anchored by a pin 46 and guided by a pin 47 for holding the free end thereof against the pin 43 in the same manner as above described for the pawl disk 31 and the spring associated therewith. A braking disk 48 is supported on the step 49 of the shaft 2 and is tightly gripped against the shoulder 51 of said shaft by the nut 52 in order that said braking disk will rotate with said shaft 2.

Pawl disks 53 and 54 similar to the pawl disk 42 may also be provided to insure adequate control over the parts as hereinafter described. The two additional pawl disks are provided with spring and spring supporting assemblies in the same manner as the pawl disk 42. It will be apparent that any convenient number of such pawl disks and spring assemblies may be utilized with the braking disk 48 as desired and three thereof are here shown for illustrative purposes only.

A coupling extension 55 extends from the end of the shaft 2 and is arranged to cooperate with the shaft 6 in any convenient manner.

A cup shaped closure 56 is threadedly affixed to the base 1 and encloses the uni-directional braking brake assembly 7 and may conveniently be provided with a central opening 57 in its bottom for the reception of a suitable pilot, or hub, of conventional counter means 58. Said counter means 58 are preferably affixed to said cup shaped closure 56 by suitable cap screws, as shown, or by any other convenient means whereby to support said counter thereon.

*Operation*

It will thus be apparent that reciprocating motion applied to the free end of the pin 4 will be converted into oscillating motion of the sleeve and thence, through the uni-directional clutch 5 there will be established intermittent, uni-directional, rotary motion of the shaft 2. This is transmitted to the shaft 6 and drives the counter in a convenient manner. The uni-directional brake 7 prevents reverse motion of the shaft 2 which might otherwise occur in response to frictional drag during return strokes of the reciprocating means, namely, those strokes which result in clockwise motion of the sleeve 3 as viewed in Figure 3.

Therefore, it will be appreciated that I have provided a device capable of a high degree of accuracy. All of the operating parts are mounted directly or indirectly upon the annular portion 8 so that, excepting for the removal of the pin 4, both the thimble portion 14 and the cup shaped closure 56 can be removed for the exposure of all of said operating parts without disturbing any of said parts in any degree.

Accordingly, the objects and purposes above set forth have been accomplished.

While a specific embodiment of my invention has been above set forth as illustrative thereof, it should be understood that various modifications may be made from the particular structure so selected and also that modifications will be within the terms of the hereinafter appended claims excepting as said claims may be by their own terms expressly limited otherwise.

I claim:

1. For use with a counter having a rotatable shaft, a device for converting that portion of reciprocating motion which is in a selected direction into intermittent uni-directional rotary motion, the combination comprising: a generally cup shaped base member having a central opening therein positioned co-axially with respect to the annular portion thereof; a shaft extending through the opening and rotatably supported with respect to said cup shaped base member; a driving disk mounted on said shaft for rotation therewith and located adjacent one axial end of said base member; a sleeve on said shaft and rotatable with respect thereto and located adjacent said driving disk and on the side thereof remote from said base member; a plurality of clutch disks eccentrically and rotatably supported upon said driving disk and arranged around the periphery of said sleeve; means urging said clutch disks into peripheral engagement with said sleeve for rotating said driving disk intermittently in a single rotative direction upon oscillation of said sleeve; a braking disk arranged on said shaft for rotation therewith and disposed adjacent the other axial end of said base member; uni-directional braking means operatively arranged between said braking disk and said base member for permitting rotation of said shaft only in the direction in which it will normally be driven by said driving disk and preventing rotation of said shaft in a reverse direction; means connecting said shaft to the input shaft of the counter and means translating said reciprocating motion into oscillating motion of said sleeve.

2. The apparatus as described in claim 1 including a pin mounted on each of said clutch disks at a point thereon substantially diametrically opposed to the point of connection of said clutch disk to said driving disk and wherein said means for urging each of said clutch disks into peripheral engagement with said sleeve includes a flat wire spring secured at one end to said driving disk and having its other end engaging said pin and urging said pin toward said sleeve.

3. The combination of claim 2 including a spring guide pin secured to said driving disk and engaging said spring for urging said spring into engagement with the pin on said clutch disk.

4. The apparatus as described in claim 1 wherein said clutch disks and said driving disk are within the cup portion of said base member and having a cap closing the open end of said cup, and said cap including means for permitting the extension therethrough of said means for translating said reciprocating motion into oscillating motion of said sleeve.

5. Means as defined in claim 1 including a cup shaped member enclosing the end of said base member adjacent said braking disk, said cup member including means permitting the passage of a shaft therethrough.

6. For use with a counter having a rotatable shaft, a device for converting that portion of reciprocating motion which is in a selected direction into intermittent, uni-directional, rotary motion, the combination comprising: a substantially cup shaped base member having a co-axial central opening through the bottom thereof; a shaft extending through said opening; a driving disk on said shaft and affixed thereto for rotation therewith and within the cup portion of said base member; a sleeve on a portion of said shaft extending beyond the free edges of said cup member; a plurality of clutch disks eccentrically and rotatably supported upon said driving disk and arranged around the periphery of said sleeve; resilient means urging said clutch disks into peripheral engagement with said sleeve for applying uni-directional, intermittent, rotation to said driving disk upon an oscillating motion of said sleeve, said driving disk similarly rotating said shaft; a braking disk on said shaft on the opposite side of the bottom of said cup member from said driving disk, and a uni-directional braking means operatively arranged between the bottom of said cup member and said braking disk for permitting rotation of said shaft only in the direction in which it is normally driven by said driving disk and preventing rotation in the reverse direction; a first cap member surrounding said sleeve and having a radially extending flange for cooperating with said cup member and closing the end thereof, said first cap member having an opening through that portion thereof that surrounds said sleeve member and a pin extending from said sleeve member through said opening to a point radially external thereof and a second cap member arranged over said braking disk and said braking means and supported on said base member, said second cap member having an opening in the bottom thereof.

7. A device for converting reciprocating motion into intermittent, uni-directional, rotary motion, the combination comprising: a cup-shaped base member having a central boss therein and an opening through said boss concentric with said base member; a shaft rotatably supported within said opening and extending beyond said base member at both ends thereof; a sleeve upon said shaft, and rotatably mounted with respect thereto, at the end thereof adjacent the lip of said cup-shaped member and a driving member mounted upon said sleeve in non-rotatable relationship therewith and including a flange thereon substantially closing the space within the rim of said cup-shaped member; a driving disk secured to said shaft and positioned between the end of said boss and the adjacent end of said sleeve; a plurality of clutch disks eccentrically and rotatably supported around the periphery of said driving disk radially outwardly of said sleeve and normally in contact with the periphery of said sleeve and resilient means urging said clutch disks into engagement with the periphery of said sleeve, such engagement effecting rotation of said driving disk and said shaft in one rotative direction when said sleeve is oscillated; a brake disk secured concentrically upon said shaft for rotation therewith and positioned on the opposite side of said cup-shaped member from said driving disk; a plurality of pawl disks secured eccentrically to the bottom of said cup-shaped base member and radially outwardly of said brake disk in normal contact with the periphery thereof; resilient means urging said pawl disks against the periphery of said brake disks for preventing rotation of the shaft in the other rotative direction.

References Cited in the file of this patent
UNITED STATES PATENTS

| | | |
|---|---|---|
| 1,222,712 | Armstrong | Apr. 17, 1917 |
| 1,296,345 | Walk | Mar. 4, 1919 |
| 1,719,613 | Kohler | July 2, 1929 |
| 1,985,406 | Galkin | Dec. 25, 1934 |
| 2,217,183 | Ross | Oct. 8, 1940 |
| 2,457,907 | Malmsten | Jan. 4, 1949 |
| 2,554,305 | Luehrs | May 22, 1951 |